B. HERSHEY.
Machine for Welding Chain Links.
No. 166,376.  Patented Aug. 3, 1875.
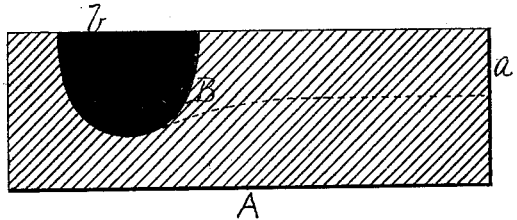
Fig. 1.
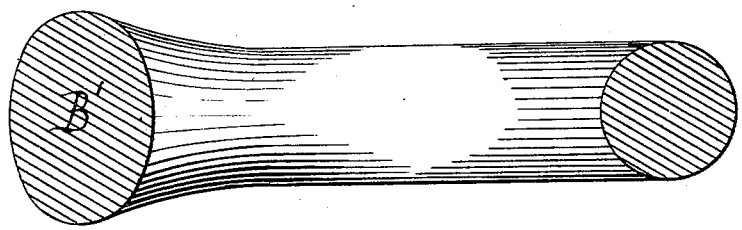
Fig. 2.
Fig. 3.
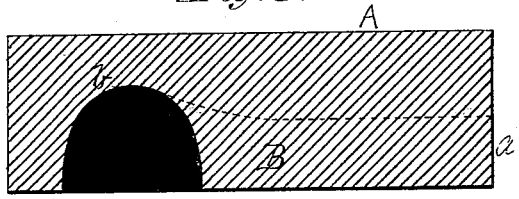
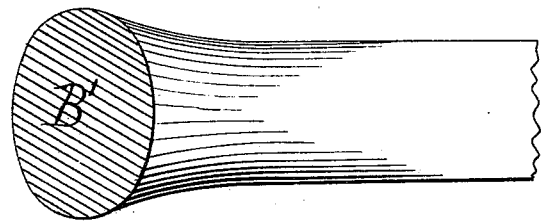
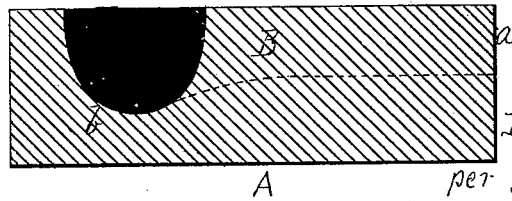
Witnesses:
Edwin James.
John R. Jones
Inventor:
Benjamin Hershey
per J. E. J. Holmead
Attorney.

2 Sheets--Sheet 2.

B. HERSHEY.
Machine for Welding Chain Links.

No. 166,376.   Patented Aug. 3, 1875.

Witnesses:
Edwin James.
John K. Jones.

Inventor:
Benjamin Hershey.
per J. E. P. Holmead.
Attorney.

N. PETERS, PHOTO-LITHOGRAPHER, WASHINGTON, D. C.

UNITED STATES PATENT OFFICE.

BENJAMIN HERSHEY, OF ERIE, PENNSYLVANIA, ASSIGNOR TO PITTSBURGH CHAIN AND CAR-LINK MANUFACTURING COMPANY.

IMPROVEMENT IN MACHINES FOR WELDING CHAIN-LINKS.

Specification forming part of Letters Patent No. 166,376, dated August 3, 1875; application filed March 23, 1875.

CASE H.

*To all whom it may concern:*

Be it known that I, BENJAMIN HERSHEY, of the city and county of Erie, and State of Pennsylvania, have invented certain Improvements in Dies for Welding-Machines, of which the following is a full, clear, and exact description, reference being had to the accompanying drawing and the letters of reference marked thereon, making part of this specification, in which—

Figure 4:
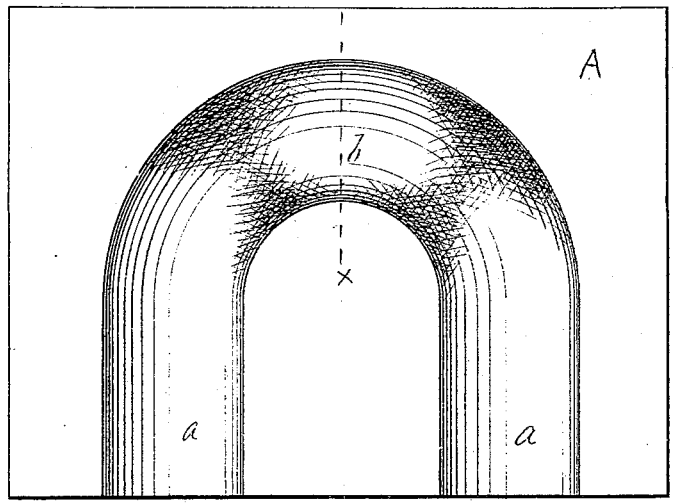
Figure 5:
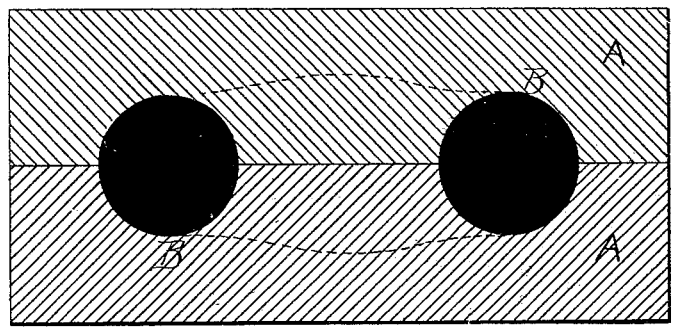

Figure 1 is a cross-section of one of the dies. Fig. 2 is a view of the link. Fig. 3 is a cross-section on the line $x\ x$, Fig. 4, of the two dies, with a link between them. Fig. 4 is a top-plan view of one of the dies. Fig. 5 is a vertical sectional view of both of the dies in position.

The object of my improvement, like my former inventions which relate to the cavities of the dies, is designed to provide for and utilize a surplus or excess of stock at the welded section of the link.

The dies which constitute my present invention contemplate being used to effect a weld in a blank which has previously been bent to a U shape, and having its ends properly scarfed. The cavities in the dies are of such contour that the sections of their parallel or horizontal grooves are of uniform diameter throughout, while the cavities at their arched or curved sections are scooped or cupped out at their lower and upper surfaces, respectively, so that while the horizontal diameter of a cross-section of the curved portion is uniform with the diameters of the parallel portions the vertical diameter is considerably increased.

The construction and operation of my invention are as follows:

A A are two dies, and may be arranged in any suitable machine, or operated through any suitable mechanism. These dies may both be secured in movable carriages, or one stationary and the other movable, and are designed to be brought together as ordinary clamping-dies are, and the blank may be driven or pressed in, as is the case when a butt-weld is desired; or they may be so arranged as to effect the welding of the lapping scarfed ends of the link, as in my previous applications; but the method first alluded to is deemed preferable. The cavities B of these dies A A are of the form shown in Fig. 1, and are designed to impart, through their joint action on the welded section of the link, such a contour as is shown clearly in Fig. 3. The sections $a\ a$ of the cavities of these dies are of such dimensions that when they are brought together at their parallel sections these dies, through the registering of these sections of their cavities, shall form or provide an inclosed groove of the same diameter throughout as is the original blank. Not so, however, with their curved sections $b\ b$, as these are depressed, or, as it were, scooped out, the curve or angle of the depression being such as to impart a print of the form shown at B', Figs. 2 and 3.

The dies having been brought together, as represented in Fig. 6, and the blank having been bent to a U shape or staple form, and its scarfed ends properly heated, the parallel arms of the blank are inserted in the openings $a\ a$ of the cavities, and are readily pushed along the parallel sections of the cavities. Power is now applied so as to cause the ends of the blank to enter the curved sections $b\ b$ of the cavities, and to fill the same and assume its form, leaving a print corresponding with the same in outline, and which is shown at B', Figs. 2 and 3.

The scarfed ends of the link, being arranged on opposite sides, will not meet, as is the case with the butt-weld, but will so pass as to leave their points on opposite sides, and their wedge-shaped faces will pass each other, and, being of a welding heat, become firmly united, and which will work off the slag, work up the scarf, and leave the excess or surplus of metal upset through the cross-section of the weld—not immediately at the center, but gradually distributed from the center along the curve, as clearly shown at Figs. 2 and 3. Thus it will be seen that the excess of metal is so distributed as to leave a surplus of stock, and which affords an increased degree of strength at the welded section of the link.

The link having been welded through the action of the dies A A, and the metal upset at its welded section, as clearly shown at B', Figs. 2 and 3, the dies are opened, and the link is removed. The finishing of the link is now effected through the action of dies whose cavities are of such contour as to work the welded section of the link down to the desired form.

What I claim as new, and desire to secure by Letters Patent of the United States, is—

The dies A A, having cavities of the form described, and which, through their joint action, upset the excess of metal at the welded section of the link, imparting to the same a print or form such as is shown at B', Figs. 2 and 3.

In testimony whereof I have signed my name to this specification in the presence of two subscribing witnesses.

B. HERSHEY.

Witnesses:
 EDWIN JAMES,
 JOS. T. K. PLANT.